US011381545B2

(12) United States Patent
Azulay et al.

(10) Patent No.: US 11,381,545 B2
(45) Date of Patent: Jul. 5, 2022

(54) MULTI-LAYER NAVIGATION BASED SECURITY CERTIFICATE CHECKING

(71) Applicant: Microsoft Technology Licensing, LLC, Redmond, WA (US)

(72) Inventors: Itamar Azulay, Mishmar Ayyalon (IL); Daniel Senderovich, Netanya (IL); Tomer Cherni, Ganey Tikva (IL); Meir Blachman, Ramat Gan (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 53 days.

(21) Appl. No.: 16/881,661

(22) Filed: May 22, 2020

(65) Prior Publication Data

US 2021/0367928 A1    Nov. 25, 2021

(51) Int. Cl.
*H04L 9/40* (2022.01)
*H04L 9/32* (2006.01)
*H04L 67/10* (2022.01)
*H04L 67/56* (2022.01)
*H04L 67/02* (2022.01)

(52) U.S. Cl.
CPC ........ *H04L 63/0281* (2013.01); *H04L 9/3268* (2013.01); *H04L 63/10* (2013.01); *H04L 67/02* (2013.01); *H04L 67/10* (2013.01); *H04L 67/28* (2013.01); *H04L 2209/76* (2013.01)

(58) Field of Classification Search
CPC .............. H04L 63/0281; H04L 9/3268; H04L 2209/76
See application file for complete search history.

(56) References Cited

U.S. PATENT DOCUMENTS

| | | | | |
|---|---|---|---|---|
| 2012/0278872 | A1* | 11/2012 | Woelfel | H04L 63/0281 726/7 |
| 2014/0180835 | A1* | 6/2014 | Bitran | G06F 21/6209 705/14.73 |
| 2018/0254896 | A1* | 9/2018 | Moysi | H04L 9/3268 |
| 2019/0116153 | A1* | 4/2019 | Deverakonda Venkata | H04L 67/02 |

\* cited by examiner

*Primary Examiner* — Esther B. Henderson
(74) *Attorney, Agent, or Firm* — Schwegman Lundberg & Woessner, P.A.

(57) ABSTRACT

Generally discussed herein are devices, systems, and methods for secure cloud application provisioning. A method can include, while providing access to the cloud application, receiving data indicating a first universal resource locator (URL) entered in a search bar of a web browser associated with the cloud application has changed to a second URL, determining whether the second URL has a valid certificate, and in response to determining the second URL is associated with the cloud application and a valid certificate for the second URL exists, providing resources for the second URL and the valid certificate to the web browser or in response to determining the second URL is not associated with the application, re-directing the web browser away from the proxy server.

16 Claims, 5 Drawing Sheets

MULTI-LAYER NAVIGATION BASED SECURITY CERTIFICATE CHECKING

BACKGROUND

If an organization wants to have a secure website that uses encryption, the organization can obtain a site, or host, certificate. The certificate indicates an entity that manages the website and a validity date of the certificate. There are two elements that indicate that a site uses encryption: A closed padlock, which, may be displayed in different locations depending on the browser, and a Uniform Resource Locator (URL) (sometimes called a Universal Resource Locator) that begins with "https:" rather than "http:"

By making sure a website encrypts information and has a valid certificate, a user can help protect themself against attackers who create malicious sites to gather information about the user. A certificate can also help assure a user accessing the website knows where the user information is going or who is receiving the information before the user submits the information to the website.

An organization's website that has a valid certificate ensures that a certificate authority has taken steps to verify that the web address actually belongs to that organization. When a user types a URL or follows a link to a secure website, the user's browser will check the certificate for the following characteristics: the website address matches the address on the certificate and the certificate is signed by a certificate authority that the browser recognizes as a "trusted" authority.

If the browser senses a problem with the certificate, the browser may present a dialog box that claims there is an error with the site certificate. This may happen if the name to which the certificate is registered does not match the site name, if a user does not trust the company who issued the certificate, or if the certificate has expired. The user can be presented with the option to examine the certificate, after which the user can accept the certificate forever accept it only for that particular visit, or choose not to accept it. An issue with an invalid certificate is sometimes easy to resolve (perhaps the certificate was issued to a particular department within the organization rather than the name on file). If one is unsure whether the certificate is valid or questions the security of the site, they may choose to not trust the site.

There are multiple ways to verify a web site's certificate. One option is to click on the padlock icon near the search bar. However, browser settings may not be configured to display the status bar that contains the icon. Also, attackers may be able to create malicious websites that fake a padlock icon and display a false dialog window if you click that icon. A more secure way to find information about the certificate is to look for the certificate feature in menu options. This information may be under the file properties or the security option within the page information. A dialog box may be displayed with information about the certificate, including who issued the certificate (e.g., so that an entity can make sure that the issuer is a legitimate, trusted certificate authority).

Some organizations also have their own certificate authorities that they use to issue certificates to internal sites such as intranets, who the certificate is issued to—the certificate can be issued to the organization who owns the web site. Users may not trust the certificate if the name on the certificate does not match the name of an expected organization or person, or the certificate has expired. Most certificates are issued for one or two years. One exception is the certificate for the certificate authority itself, which, because of the amount of involvement necessary to distribute the information to all of the organizations who hold its certificates, may be ten years. One should be wary of organizations with certificates that are valid for longer than two years or with certificates that have expired.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Systems, methods, device, and computer or other machine-readable media can provide improvements over prior cloud provisioning solutions. The improvements can include reduced time to deployment, increased security assurance, or reduced time to implement an application change, among others.

A proxy server configured to provide access to a cloud application can include processing circuitry and a memory. The memory can including instructions that, when executed by the processing circuitry, cause the processing circuitry to perform operations for providing secure access to the cloud application. The operations can include, while providing access to the cloud application, receiving data indicating a first universal resource locator (URL) entered in a search bar of a web browser associated with the cloud application has changed to a second URL. The operations can include determining whether the second URL has a valid certificate. The operations can include, in response to determining the second URL is associated with the cloud application and a valid certificate for the second URL exists, providing resources for the second URL and the valid certificate to the web browser or in response to determining the second URL is not associated with the application, re-directing the web browser away from the proxy server.

The operations can include, in response to determining the certificate is not present in the certificates database and the second entry is associated with the cloud application, issuing a request to a certificate issuer for the certificate. The operations can include, in response to determining the certificate is not present in the certificates database, redirecting the web browser to a stalling webpage. The operations can include receiving, from an administrator of the cloud application, data indicating one or more top level domains of the cloud application, code of the cloud application, and a policy defining access control to the cloud application and controlling access to the cloud application based on the policy.

The operations can include identifying one or more static URLs in the code of the cloud application. The operations can include altering the identified URLs and the one or more top level domains to a different domain. Altering the identified URLs and the top level domains can include inserting a different endpoint directly after the top level domain of the URLs, wherein the endpoint is controlled by the cloud provider.

The operations can include generating, for each of the identified static URLs, a corresponding certificate and storing the static URLs and corresponding certificate in the certificates database. The operations can include receiving, from a URL monitor of the web browser, a dynamic URL different from the static URLs, and comparing a top level domain of the received URL to the one or more top level domains of the cloud application.

The operations can include, in response to determining the top level domain of the received URL does not match the one or more top level domains of the cloud application, redirecting the web browser away from the proxy server. The operations can include, in response to determining the top level domain of the received URL does match the one or more top level domains of the cloud application, causing the web browser to navigate to a stalling webpage, requesting the certificate issuer generate a certificate for the received URL, and providing resources of the URL and the requested certificate to the web browser.

A method can include performing the operations of the proxy server. A non-transitory machine-readable medium can include instructions that, when executed by a machine, cause the machine to perform operations of the proxy server.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

It is quite difficult to allow a customer that wants to provide a specified application through a cloud provider with little or no application customization or configuration on the part of the customer. Consider an application in which users can set up meetings, chat, share files, share links, edit documents, or the like. The customer can want to allow users with sufficient permissions access to the shared documents or areas of the application while stopping users with insufficient permissions access to the shared documents or areas of the application.

To control such access, a domain of the application can be changed to a domain of a cloud application manager. The cloud application manager (sometimes called a cloud provider) can port the application from the original to their own domain. A web certificate can be generated for the new domain (either during application execution or in advance). The web certificate can indicate the cloud provider as the entity that provides the access to the webpage.

In some embodiments, the cloud application onboarding process does not require any installation on a user device for uploading to the cloud. Operation of the cloud application can include downloading code of a web browser that includes additional functionality (e.g., domain monitoring). Most cloud-based application providers require some sort of Wizard or agent to be uploaded on a user device. By storing the application at a destination associated with the new domain, the cloud provider can more easily monitor access to, and actions of the application.

The cloud provider can provide security monitoring. The security monitoring can be application specific. The security monitoring can be performed in response to determining the accessed URL is relevant to an application being monitored. As the customer can change the application without cloud provider knowledge, determining where the application begins and ends can be challenging.

For example, consider a user that is currently accessing a monitored application (an application hosted by the cloud provider). Then, the user tries to navigate to a next webpage. It is difficult to determine whether the next webpage is related to the application (and is to be monitored) or is not related to the application (and is not to be monitored). If the webpage is related to the application, and is to be monitored, a proxy server can determine whether there is a valid certificate for the webpage. If there is no valid certificate, one can be generated. If there is a valid certificate, the certificate can be provided with the web content. The certificate can provide assurance that the content is coming from an expected content provider. If there is no certificate, and a certificate needs to be generated, a stalling webpage can be presented while the proxy server requests a certificate from a certificate issuer. The stalling page can indicate that the page will load soon.

To determine whether the webpage is related to the application, a top level domain of the URL associated with a request can be compared to top level domains associated with the application. If the top level domain matches a top level domain associated with the application, then the session can be monitored. If the top level domain does not match, the session will cease to be monitored, and the user will receive webpage data from a different server (one not managed by the cloud provider).

A certificate can be pre-generated for each static resource in the application. The proxy server determines that a domain being rendered needs a certificate. The proxy server can request a certificate issuer generate a certificate for each domain that is evident based on the webpage (called static resources). Static resources can include formatting, style, or the like.

A certificate for a dynamic resource (a resource that is not readily apparent in the application) can be handled differently than a certificate for a static resource. For example, consider a user causing a change in the address bar for an address that is not part of the application. This can be detected by code of a web browser on a client side application and the proxy can be alerted to the navigation.

Embodiments allow for cloud provider solutions to monitoring a large number of web applications. Embodiments can allow application onboarding without the developer having to onboard specific applications or have much interaction with a customer. The customer can onboard the application using a simple service through which the customer provides top-level domains. In the applications, domains can change or the application can change. Usually, a manual change will have to occur, where the cloud provider updates a certificate or a list of allowed domains, or both, to allow the domain change to occur. Embodiments can handle this change without manual operations.

Embodiments can provide advantages, such as by: 1) changing an endpoint to a cloud provider controlled endpoint, rather than a developer controlled endpoint, 2) generating certificates and supporting a monitored session for only those URLs that are part of the application, 3) pre-generating a certificate for a static domain, 4) generating, during application runtime, a certificate for a dynamic domain, based on a request from the browser. The request can alert the proxy server that a domain might be needed to show a page correctly. The proxy server can then cause the certificate to be generated. Code can be injected in the browser to compare expected URL calls from the application.

Figure 1:
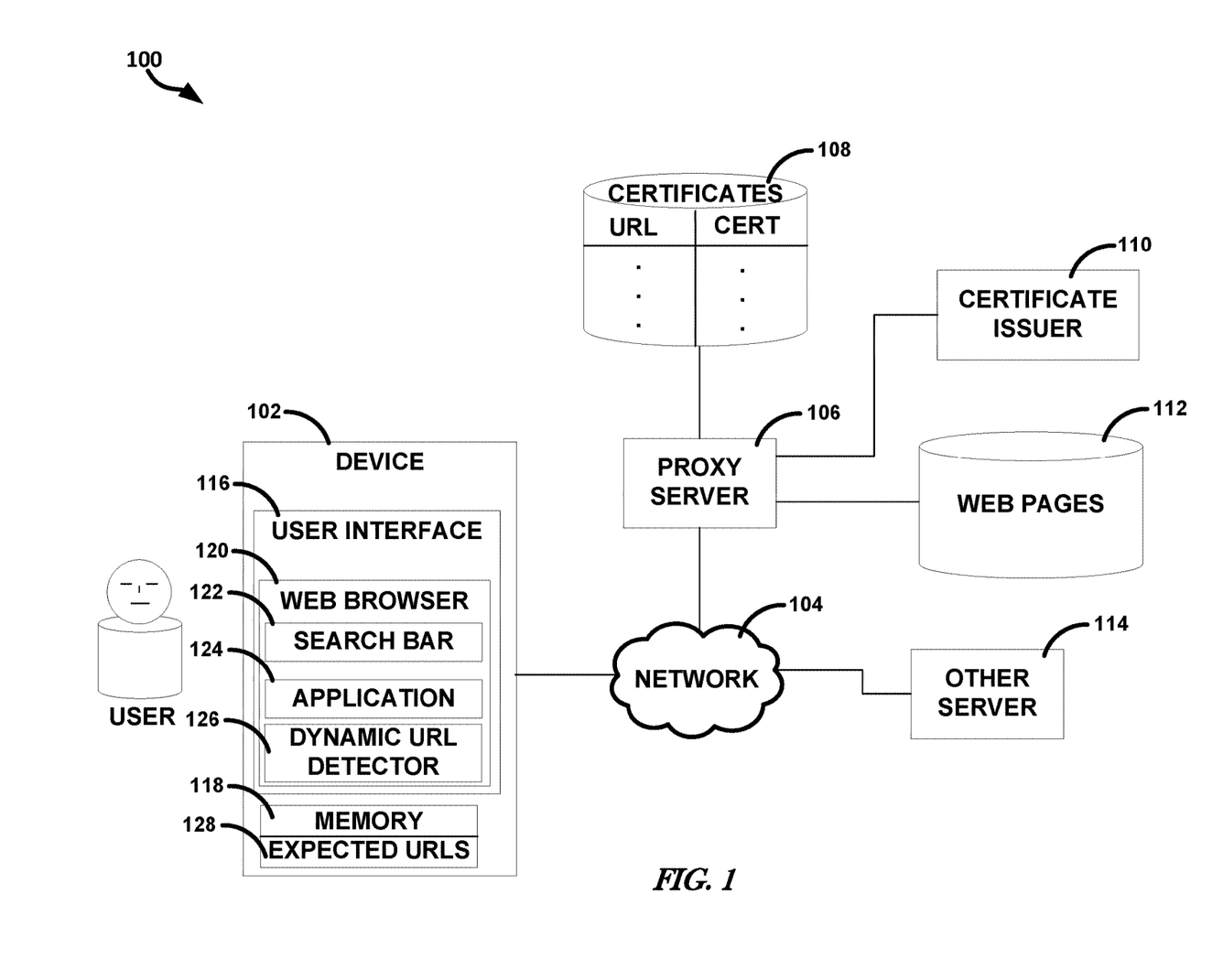
FIG. 1 illustrates, by way of example, a diagram of an embodiment of a system for cloud application monitoring and management.

FIG. 1 illustrates, by way of example, a diagram of an embodiment of a system 100 for cloud application monitoring and management. The system 100, as illustrated includes a user device 102, network 104, a proxy server 106, a certificates database 108, a certificate issuer 110, web pages 112, and another server 114. The network 104 can be communicatively coupled to the device 102, the proxy server 106, and the other server 114. The proxy server 106 can be coupled to the network 104, the certificates 108, the certificate issuer 110, or the web pages 112.

The device 102 can include any device capable of connecting to the network 104. The device 102 as illustrated includes a user interface 116 and a memory 118. The user interface 116, in general, provides the user with access to the functionality of the device 102. The user interface 116 can provide the user with access to the network 104, such as through a web browser 120.

Code that, when executed, provides functionality of the web browser 120 can be stored a the memory 118. A user can interact with a search bar 122 of the web browser 120 to navigate to a different website. The user can upload access the functionality of a cloud application 124 through the web browser 120. A dynamic URL detector 126 of the web browser 120 can determine when a URL in the search bar 122 is not in a list of expected URLS 128.

The web browser 120 is a software application for accessing information accessible through the network 104. The user can request content by entering a character string in a search bar 122. The character string can be a URL, in some examples. In some instances, the contents of the search bar 122 are not changed directly by user interaction with the search bar 122. The contents of the search bar 122 can be changed by user interaction with an application 124, for example.

The functionality of the application 124 can be provided to the user through the web browser 120. The application 124 can be any type that has been set up to be provided by a cloud content provider. There can be many reasons to migrate an application from local provision to the cloud. Some of these reasons include lack of a memory or processing power to execute the application 124, lack of support for application security, lack of monitoring resources to ensure that only authorized personnel are allowed access to certain portions of the application, among others.

The application 124 is a monitored application. A monitored application is an application for which application permissions, access, and security are provided by a third party (sometimes called a cloud provider) through the cloud.

The application 124 can include one or more top level domains associated therewith, through which the user accesses the functionality of the application 124. A top level domain is the string of a URL up to the first extension. For example, in the string "teams.com/resource=12345". The top level domain is "msteams.com". If a customer wants their cloud application 124 to be monitored by the cloud provider, the customer can provide the top level domain "teams.com". Then, whenever a request for a page navigation is received by the cloud provider, and the page navigation include the top level domain ("teams.com" in this example) the session can remain monitored. The domain can be linked to an internet protocol (IP) address that indicates a location of a resource to be presented by the web browser. This linking is typically provided by a domain name server (DNS) (part of the network 104).

The web browser 120 can be modified with code that causes the web browser to operate differently than normal. The web browser 120 can include a dynamic URL detector 126. Anytime the user is in a monitored session and the contents of the search bar 122 are changed, the dynamic URL detector 126 can compare the URL from the search bar 122 (or just a top level domain of the URL from the search bar 122) to expected URLs 128 in a memory 118 of the device 102. The expected URLs 128 can include top level domains, full domain names, or the like, of domains accessible by the application 124. In some embodiments, the expected URLs 128 can include domains associated with the application and for which a certificate exists in the certificates database 108. A monitored session is one that includes access to an application provided by, and monitored by, a cloud provider.

If the dynamic URL detector 126 determines that the contents of the search bar 122 are not in the expected URLs 128, the dynamic URL detector 126 can send an alert to the proxy server 106. The alert can indicate that the URL was not in the expected URLs 128. The alert can be in the form of a URL that indicates the unexpected URL and re-directs to a domain that determines whether the unexpected is associated with the application or not. This can be facilitated by a re-direct to an intermediate URL. For explanation, consider a monitored hypertext markup language (HTML) page that includes a hyperlink to www.nba.com/phoenixsuns. A redirect, for certificate checking can occur in response to the user selecting the link. The redirect can be to a certificate checking endpoint. The dynamic URL detector 126 can cause the address bar of the user to change. In this example, the change can be to www.cas-control-endpoint-.cas.ms/url=www.nba.com/phoenixsuns. The proxy server 106 can then check whether the url after the "url=" is associated with a top level domain provided by a customer and if so, whether the URL after the "url=" has a valid certificate. The domain www.cas-control-endpoint.cas.ms can be guaranteed to have a valid certificate. The URL after "url=" is not guaranteed to have a valid certificate or to be associated with a monitored page. If the URL after "url=" is not associated with a recognized top level domain, the user can be re-directed to the endpoint associated with the URL after "url=" (out of the monitored session). In some embodiments, when the user is re-directed out of the monitored session, a software control can be displayed on the user interface 116. The software control can ask the user if they wish to leave the monitored session. The user can then select whether they wish to leave the monitored session or not and the web browser 120 can respond accordingly. If the URL after "url=" is associated with a top level domain, the user can be redirected to the cloud provider version of the URL that is accessible by a domain that is an augmented version of the URL of the customer.

If the dynamic URL detector 126 determines that the URL is in the expected URLs, the dynamic URL detector 126 can modify the URL before it is provided in a request to the network 104.

The modification to the URL can cause the request to go to a different endpoint (web server or other place where the webpage resources of the application are retrieved from). Changing the URL can include augmenting the URL with a suffix or other portion of the URL. Consider the string "teams.com/chat?id=12345". This string can be changed to include an alteration directly after the top level domain, but still include the entirety of this string. For example, "teams.com/chat?id=12345" can be changed to, for example "teams.com.cas.ms/chat?id=12345". This URL modification indicates to the proxy server 106 that the session is monitored.

The network 104 can include routers, servers, gateways, modems, hubs, switches, multiplexers, or the like, coupled to one or more user devices (e.g., the device 102). The network 104 can include the Internet, a local area network, a wide area network, or the like. The network 104 provides the device 102 with access to content in the form of web pages.

The network 104 can be coupled to a proxy server 106, and another server 114. The proxy server 106 is implemented and monitored by the cloud provider that provides access to the application 124 in a monitored session. The other server 114 is any other server that provides access to content outside of the monitored session.

The proxy server 106 is accessible through a variety of URLs. The proxy server 106 is tasked with managing monitored sessions, loading proper content (e.g., from the web pages 112), and certificate checking for a wide variety and number of applications (e.g., the application 124).

The proxy server 106 can determine if a URL has a corresponding certificate in the certificates database 108. If the URL does not have a corresponding certificate, the proxy server 106 can issue a request to the certificate issuer 110 for a certificate. In such instances, the web browser 120 can be re-directed to a stalling web page (of the web pages 112). The stalling web page can indicate to the user that the web browser 120 will be re-directed to the requested web page soon. After the certificate is generated by the certificate issuer 110, and verified by the proxy server 106, the proxy server 106 can re-direct to the web page within the monitored session.

The certificates database 108 can include certificates indexed by domain. The certificates database 108 can be queried by domain. If the domain (URL) is present in the certificates database 108, the corresponding certificate can be provided in response. If the domain is not present in the certificates database 108, the certificates database 108 can respond with a negative acknowledgement or the like that indicates the certificate is not present. In response to the communication indicating the certificate is not present, the proxy server 106 can issue a request for the certificate issuer 110 to generate the certificate.

The certificate issuer 110, sometimes called a certification authority (CA) is an entity that issues digital certificates. The certificate issuer 110 can act as a trusted third party. The certificate issuer 110 can generate a certificate (e.g., an intermediate or root certificate) indicating the origin of the domain. The certificate issuer 110 can issue self-signed certificates, in some examples. The certificate issued by the certificate issuer 110 can be stored in the certificates database 108. The certificates authenticate that the web pages 112 are being served from a specified entity.

The web pages 112 includes data, metadata, or the like for rendering a web page on the web browser 120. The web pages 112 each include information for a specific domain. A single rendered web page can include data from one or more domains. Web page data can include an image, video, text, style or formatting data, script or other code, or the like. The web pages 112 can be retrieved by the proxy server 106 and provided to the web browser 120 (by the network 104) for rendering. The other server 114 hosts an application or other web content outside of the monitored session.

Figure 2:
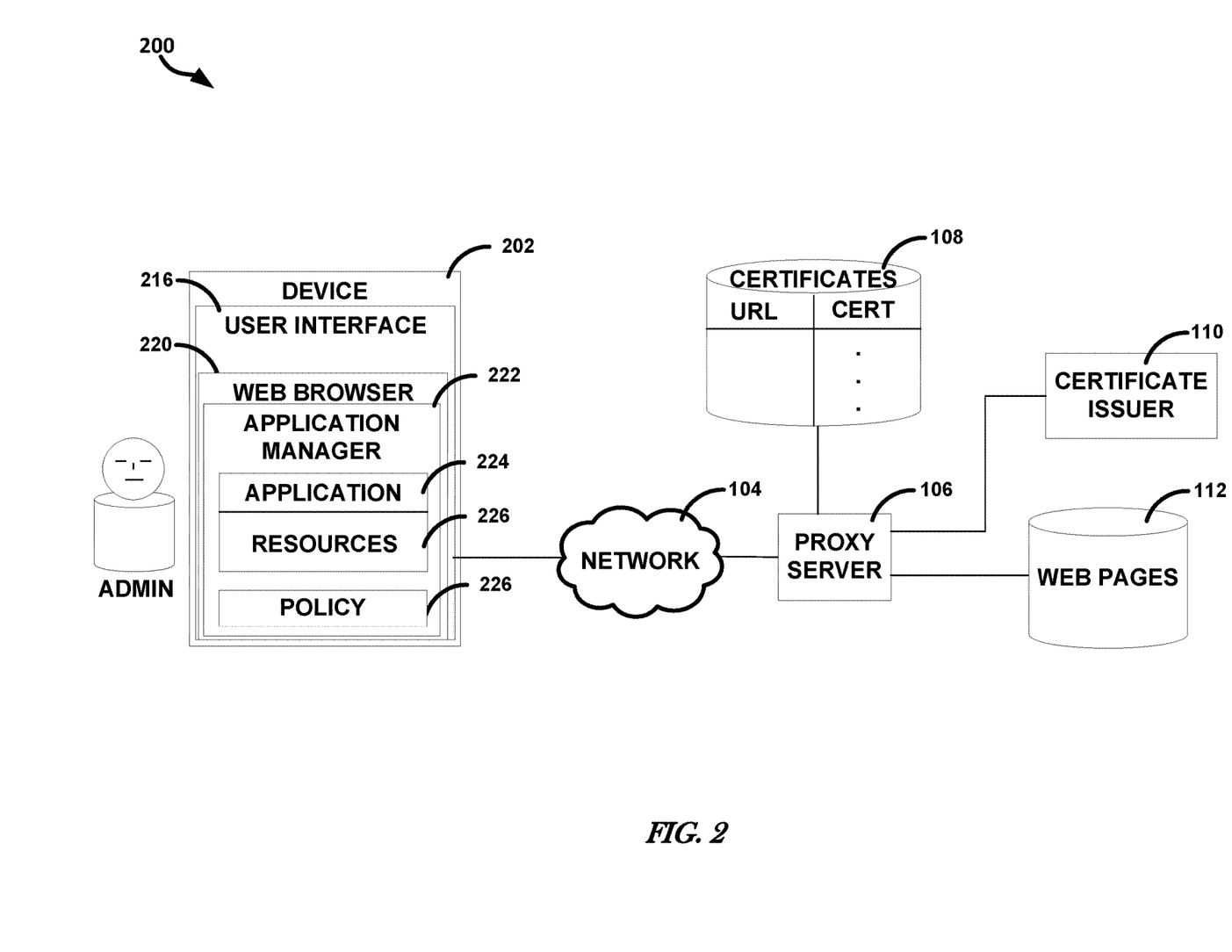
FIG. 2 illustrates, by way of example, a diagram of an embodiment of a system for configuring an application for use in a monitored session.

FIG. 2 illustrates, by way of example, a diagram of an embodiment of a system 200 for configuring an application for use in a monitored session. The system 200 as illustrated includes a device 202, the network 104, the proxy server 106, the certificates database 108, the certificate issuer 110, and the web pages 112. The network 104 can be communicatively coupled to the device 202 or the proxy server 106. The proxy server 106 can be coupled to the network 104, the certificates 108, the certificate issuer 110, or the web pages 112.

An admin can use the device 202 to setup their application to be executed in a monitored session. The device 202, similar to the device 102, can include any device can be any device capable of communicating through the network 104.

The admin can access a web browser 220 through a user interface 216 of the device 202. The admin can navigate to a webpage that exposes an application manager 222. The application manager 222 allows the admin to indicate one or more top level domains of the application 224, resources 226 of the application 224, code of the application 224, a policy 228 to be enforced by the cloud provider in providing access to the application 224, or the like.

As previously discussed, the application 224 is any application capable of being provided by a cloud provider. The resources 226 are the data provided by the domains on the web pages 112. The application 224 provides the user with access to the functionality of the resources 226 or displays data based on the resources 226 (e.g., in a format, style, or location on the user interface 216 indicated by the resources 226, or using an image, text, video, audio, or the like of the resources 226). The resources 226 of the application 224 can include certificates for the domains accessed by the application 224. The certificates can be for top level domains and/or lower level domains accessible by the application 224.

The policy 228 defines access permissions for the resources 226. The policy 228 can be indexed by resource, user, application, or the like. The policy 228 can indicate whether the user can access functionality (a portion of a resource), a resource, or the like. Access permissions can include execute, read, write, or the like.

The proxy server 106 can analyze the application 224 code and identify domains (sometimes called static domains) accessed by the application 224 and based on the application code. The proxy server 106 can then identify whether a certificate exists for the identified domains in the certificates database 108. For any static domain that does not include a certificate, the proxy server 106 can issue a request to the certificate issuer 110, for the certificate. Then the proxy server 106 can store the certificate and associated URL in the certificate database 108.

After the admin has the application setup on the proxy server 106, any access of the application 224 (as indicated by a top level domain request from the web browser 220) can be redirected to the proxy server 106. This can be implemented by a change in a DNS server that changes the IP address of the URL associated with the application to the IP address of the monitored application.

Figure 3:
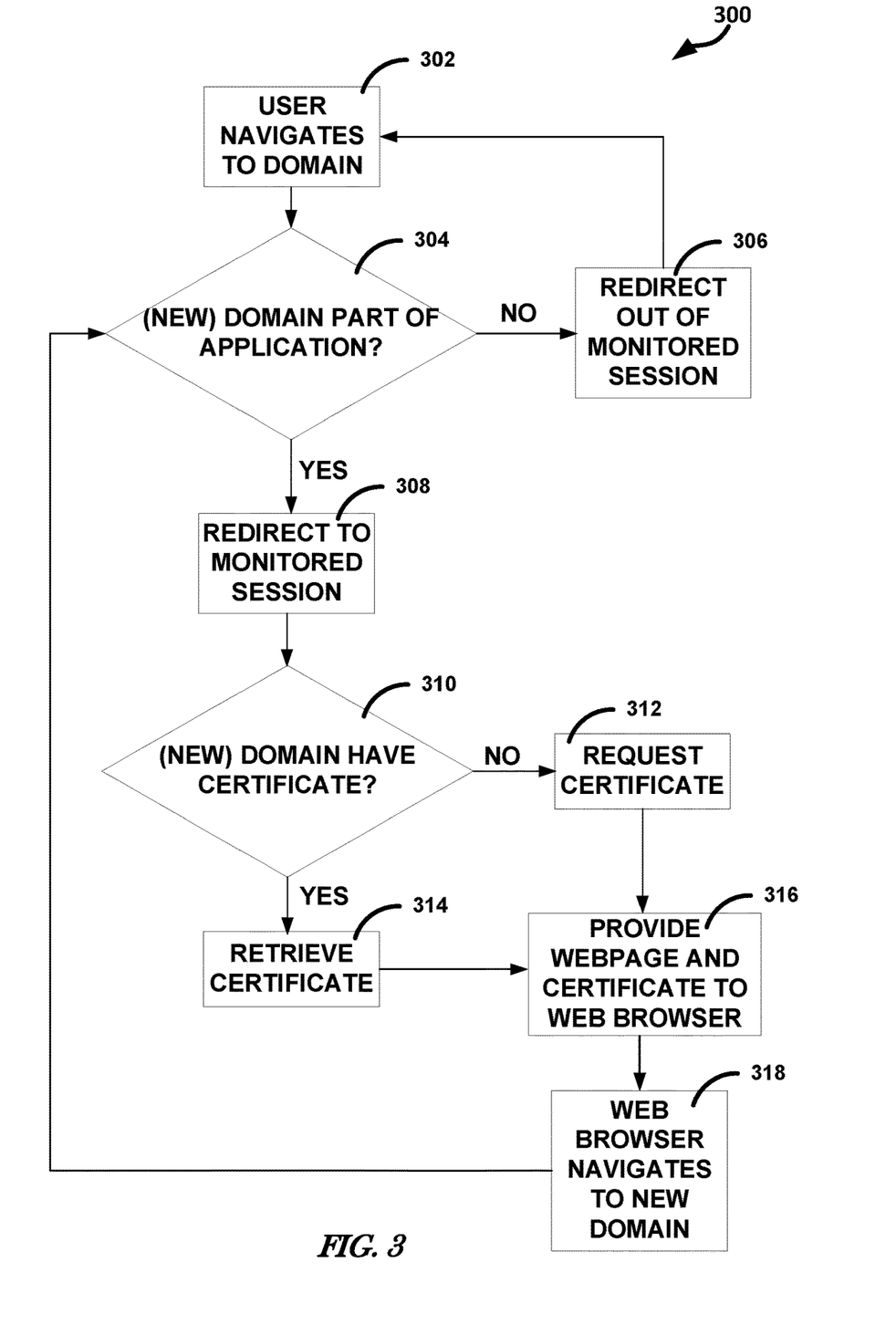
FIG. 3 illustrates, by way of example, a diagram of an embodiment of a method for multi-layer navigation-based certificate checking.

FIG. 3 illustrates, by way of example, a diagram of an embodiment of a method 300 for multi-layer navigation-based certificate checking. The method 300 can help a cloud provider manage a larger number of cloud resources and maintain secure, monitored sessions with the cloud resources. The method 300 can help an application provider provide access to their application through the cloud provider.

The method 300 as illustrated includes a user navigating to a domain (e.g., using the web browser 120), at operation 302. The navigating can occur while the user is accessing an application 224 provided through the proxy server 106.

At operation 304, the proxy server 106 can determine whether the domain is part of the application 224 being accessed by the user. The operation 304 can include comparing a top level domain of the domain matches one or more top level domains associated with the application (e.g., by the admin). The operation 304 can include comparing more of the domain (rather than just the top level domain of the domain) to domains determined to be associated with the application 224. The domains can be determined based on history of users accessing or interacting with the application 224, the admin indicating the domains during application startup, based on analysis of the application code (sometimes called static domains), or a combination thereof.

If, at operation 304, the domain is determined to not be a part of the application 224, the web browser can be redirected out of the monitored session, at operation 306. The monitored session is the experience provided while accessing resources through the proxy server 106. The operation 306 can include directing the web browser to an endpoint that is accessible through a different server 114 than the proxy server 106.

If, at operation 304, the domain is determined to be part of the application 224 (and the web browser is not currently in a monitored session) the web browser 120 can be directed to a monitored session, at operation 308. The operation 308 can include directing domain requests to the proxy server 106.

At operation 310, the proxy server 106 can determine if the domain has a certificate in the certificates database 108. The operation 310 can include issuing a query to the database 108 based on the domain. The database 108 can return the certificate (if there is one) or a negative acknowledge (if there is no certificate in the database 108).

If, at operation 310, it is determined that the domain does not have a corresponding certificate in the database 108, the proxy server 106 can request the certificate (from the certificate issuer 110), at operation 312. The certificate issuer 110 can then produce the certificate for the domain. Since the domain can be changed to a different endpoint from the one indicated by the admin, the proxy server 106 can retain user confidence in the origin and accuracy of the certificate.

If, at operation 310, it is determined that the domain does have a corresponding certificate in the database 108, the proxy server 106 can retrieve the certificate from the database 108, at operation 314. At operation 316, the webpage and certificate can be provided to the web browser 120. The navigation bar (sometimes called search bar) of the web browser 120 can continue to be monitored while the user is in the monitored session. At operation 318, the entry in the navigation bar can change to a different domain. The method 300 can continue at operation 304.

Figure 4:
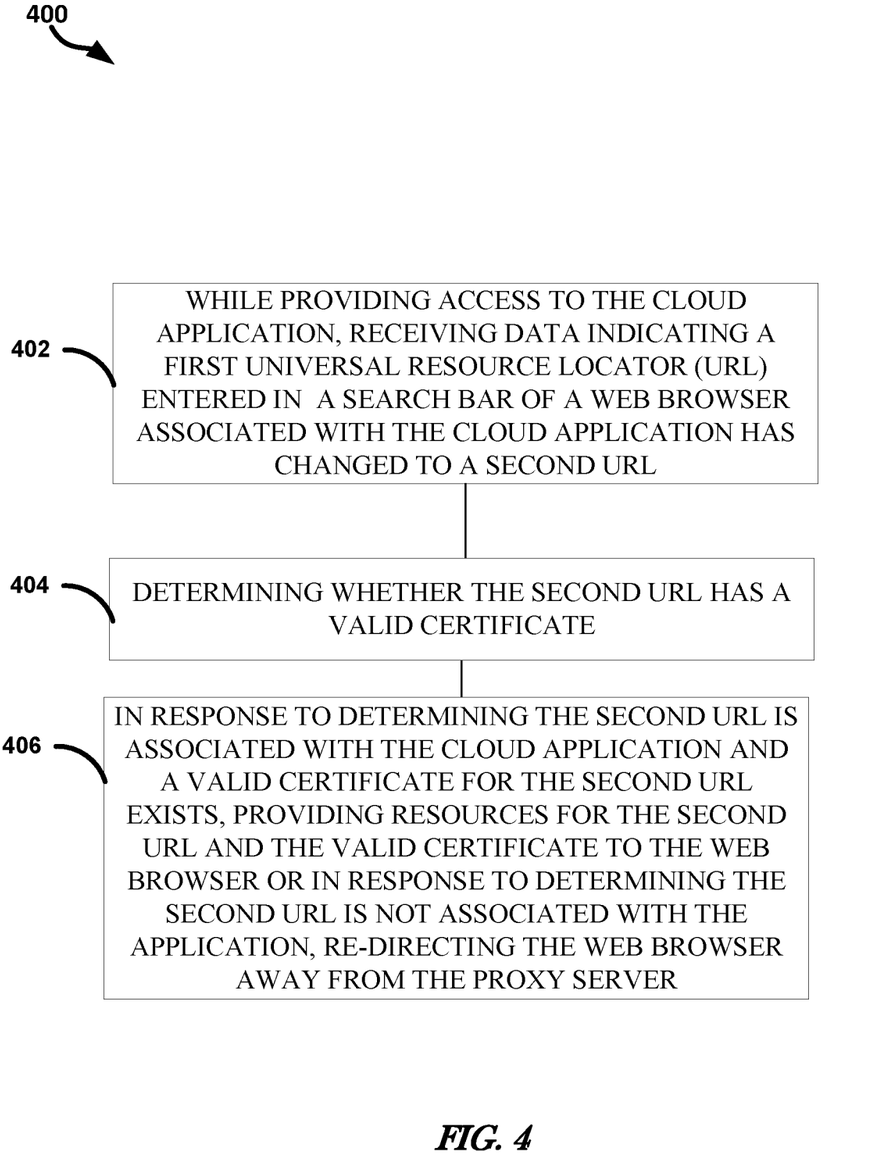
FIG. 4 illustrates, by way of example, a flow diagram of an embodiment of a method for secure cloud application provision.

FIG. 4 illustrates, by way of example, a flow diagram of an embodiment of a method 400 for secure cloud application provision. The method 400 can be performed by one or more of the components of FIGS. 1-3, such as the proxy server 106 or one or more components coupled thereto. The method 400 as illustrated includes while providing access to the cloud application, receiving data indicating a first universal resource locator (URL) entered in a search bar of a web browser associated with the cloud application has changed to a second URL, at operation 402; determining whether the second URL has a valid certificate, at operation 404; and in response to determining the second URL is associated with the cloud application and a valid certificate for the second URL exists, providing resources for the second URL and the valid certificate to the web browser or in response to determining the second URL is not associated with the application, re-directing the web browser away from the proxy server, at operation 406.

The method 400 can further include, in response to determining the certificate is not present in the certificates database and the second entry is associated with the cloud application, issuing a request to a certificate issuer for the certificate. The method 400 can further include, in response to determining the certificate is not present in the certificates database, redirecting the web browser to a stalling webpage. The method 400 can further include receiving, from an administrator of the cloud application, data indicating one or more top level domains of the cloud application, code of the cloud application, and a policy defining access control to the cloud application and controlling access to the cloud application based on the policy.

The method 400 can further include identifying one or more static URLs in the code of the cloud application. The identification can help the cloud application provisioning be more flexible. For example, a customer can change a URL that defines a location of application resources used for application functionality. The new URL can cause a change to the application. The change to the application does not need to be communicated to the cloud provider if the cloud provider identifies the URL change in the code change. The customer can provide the updated code to the application provider, such as by updating the code at the location indicated by the URL, or providing the code directly to the cloud provider.

The method 400 can further include altering the identified URLs and the one or more top level domains to a different domain. This allows the secure application provider to host the application from their own domain. Hosting from a different domain allows the application provider more control over certificate management of the URLs.

The method 400 can further include, generating, for each of the identified static URLs, a corresponding certificate and storing the static URLs and corresponding certificate in a certificates database. The method 400 can further include receiving, from a URL monitor of the web browser, a dynamic URL different from the static URLs, and comparing a top level domain of the received URL to the one or more top level domains of the cloud application. This operation allows for secure access and provisioning of resources that are within the application but are navigated to in a manner that might be out of sync with the code. For example, consider an application that provides chat functionality for users. If a user types a link to a resource and another user selects the link using the application, but the link is to a resource of the cloud application, the cloud provider can continue to manage access to that resource. This resource might, more typically, be accessed by the user navigating through menus or the like of the application (in sync with the application). By selecting the link, the user can jump to the resource without navigating the menus and the access can remain secure.

The method 400 can further include in response to determining the top level domain of the received URL does not match the one or more top level domains of the cloud application, redirecting the web browser away from the proxy server or, in response to determining the top level domain of the received URL does match the one or more top level domains of the cloud application, causing the web browser to navigate to a stalling webpage, requesting the certificate issuer generate a certificate for the received URL, and providing resources of the URL and the requested certificate to the web browser.

The electric or electronic components of the device 102, network 104, proxy server 106, other server 114, the device 202, or other device or circuitry can include one or more transistors, resistors, capacitors, inductors, amplifiers, modulators, demodulators, antennas, radios, regulators, diodes, oscillators, multiplexers, logic gates (e.g., AND, OR, XOR, negate, or the like), buffers, caches, memories, GPUs, CPUs, FPGAs, ASICs, or the like.

Figure 5:
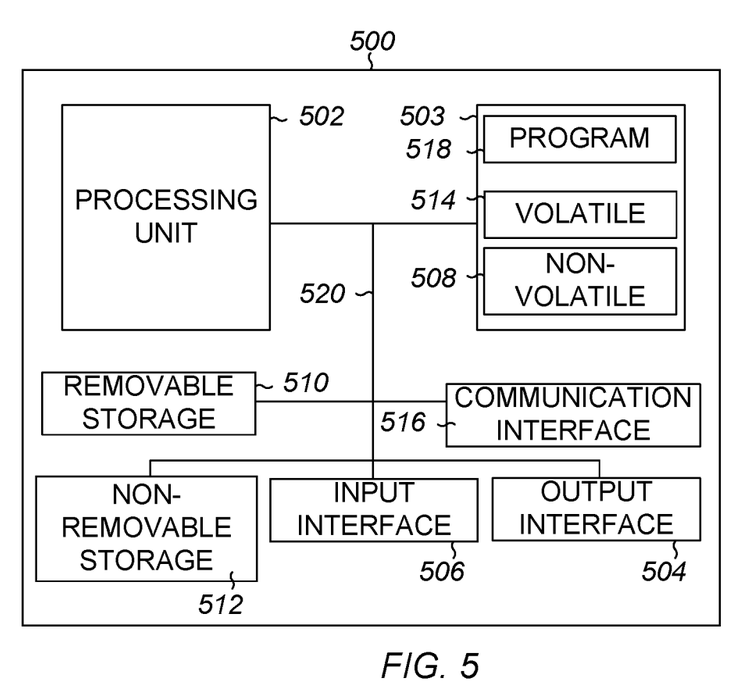
FIG. 5 illustrates, by way of example, a block diagram of an embodiment of a machine (e.g., a computer system) to implement one or more embodiments.

FIG. 5 illustrates, by way of example, a block diagram of an embodiment of a machine 500 (e.g., a computer system) to implement one or more embodiments. The machine 500 can implement a technique for secure cloud application provision, such as the method 300 or 400. The user device 102, network 104, proxy server 106, other server 114, or the device 202 can include one or more of the components of the machine 500. One example machine 500 (in the form of a computer), may include a processing unit 502, memory 503, removable storage 510, and non-removable storage 512. Although the example computing device is illustrated and described as machine 500, the computing device may be in different forms in different embodiments. For example, the computing device may instead be a smartphone, a tablet, smartwatch, or other computing device including the same or similar elements as illustrated and described regarding FIG. 5. Devices such as smartphones, tablets, and smartwatches are generally collectively referred to as mobile devices. Further, although the various data storage elements are illustrated as part of the machine 500, the storage may also or alternatively include cloud-based storage accessible via a network, such as the Internet.

Memory 503 may include volatile memory 514 and non-volatile memory 508. The machine 500 may include— or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 500 may include or have access to a computing environment that includes input 506, output 504, and a communication connection 516. Output 504 may include a display device, such as a touchscreen, that also may serve as an input device. The input 506 may include one or more of a touchscreen, touchpad, mouse, keyboard, camera, one or more device-specific buttons, one or more sensors integrated within or coupled via wired or wireless data connections to the machine 500, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 502 (sometimes called processing circuitry) of the machine 500. A hard drive, CD-ROM, and RAM are some examples of articles including a non-transitory computer-readable medium such as a storage device. For example, a computer program 918 may be used to cause processing unit 502 to perform one or more methods or algorithms described herein.

ADDITIONAL NOTES AND EXAMPLES

Example 1 can include a proxy server configured to provide access to a cloud application, the proxy server comprising processing circuitry and a memory including instructions that, when executed by the processing circuitry, cause the processing circuitry to perform operations for providing secure access to the cloud application, the operations comprising while providing access to the cloud application, receiving data indicating a first universal resource locator (URL) entered in a search bar of a web browser associated with the cloud application has changed to a second URL, determining whether the second URL has a valid certificate, and in response to determining the second URL is associated with the cloud application and a valid certificate for the second URL exists, providing resources for the second URL and the valid certificate to the web browser or in response to determining the second URL is not associated with the application, re-directing the web browser away from the proxy server.

In Example 2, Example 1 can further include, wherein the operations further comprise in response to determining the certificate is not present in the certificates database and the second entry is associated with the cloud application, issuing a request to a certificate issuer for the certificate.

In Example 3, at least one of Examples 1-2 can further include, wherein the operations further comprise, in response to determining the certificate is not present in the certificates database, redirecting the web browser to a stalling webpage.

In Example 4, at least one of Examples 1-3 can further include, wherein the operations further comprise receiving, from an administrator of the cloud application, data indicating one or more top level domains of the cloud application, code of the cloud application, and a policy defining access control to the cloud application and controlling access to the cloud application based on the policy.

In Example 5, Example 4 can further include wherein the operations further comprise identifying one or more static URLs in the code of the cloud application, and altering the identified URLs and the one or more top level domains to a different domain.

In Example 6, Example 5 can further include, wherein altering the identified URLs and the top level domains includes inserting a different endpoint directly after the top level domain of the URLs, wherein the endpoint is controlled by the cloud provider.

In Example 7, at least one of Examples 5-6 can further include, wherein the operations further comprise generating, for each of the identified static URLs, a corresponding certificate and storing the static URLs and corresponding certificate in the certificates database.

In Example 8, at least one of Examples 5-7 can further include, wherein the operations further comprise receiving, from a URL monitor of the web browser, a dynamic URL different from the static URLs, and comparing a top level domain of the received URL to the one or more top level domains of the cloud application.

In Example 9, Example 8 can further include, wherein the operations further comprise, in response to determining the top level domain of the received URL does not match the one or more top level domains of the cloud application, redirecting the web browser away from the proxy server.

In Example 10, at least one of Examples 8-9 can further include, wherein the operations further comprise, in response to determining the top level domain of the received URL does match the one or more top level domains of the cloud application, causing the web browser to navigate to a stalling webpage, requesting the certificate issuer generate a certificate for the received URL, and providing resources of the URL and the requested certificate to the web browser.

Example 11 can include a method of performing the operations of the proxy server of at least one of Examples 1-10.

Example 12 can include a non-transitory machine-readable medium including instructions that, when executed by a machine, cause the machine to perform operations of the proxy service of at least one of Examples 1-10.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A proxy server comprising:
   processing circuitry;
   a memory including instructions that, when executed by the processing circuitry, cause the processing circuitry to perform operations for providing secure access to a cloud application, the operations comprising:
   while providing access to the cloud application, receiving data indicating a first universal resource locator (URL) in a search bar of a web browser associated with the cloud application has changed to a second URL;
   determining whether the second URL has a valid certificate;
   in response to determining the second URL is not associated with the application, re-directing the web browser away from the proxy server;
   receiving, from an administrator of the cloud application, data indicating a top level domain of the cloud application, code of the cloud application, and a policy defining access control to the cloud application; and
   controlling access to the cloud application based on the policy.

2. The proxy server of claim 1, wherein the operations further comprise, in response to determining the certificate is not present in a certificates database, redirecting the web browser to a stalling webpage.

3. The proxy server of claim 1, wherein the operations further comprise:
   identifying one or more static URLs in the code of the cloud application; and
   altering the identified URLs and the one or more top level domains to a different domain.

4. The proxy server of claim 3, wherein altering the identified URLs and the top level domains includes inserting a different endpoint directly after the top level domain of the URLs, wherein the endpoint is controlled by a cloud provider.

5. The proxy server of claim 3, wherein the operations further comprise generating, for each of the identified static URLs, a corresponding certificate and storing the static URLs and corresponding certificate in a certificates database.

6. The proxy server of claim 3, wherein the operations further comprise receiving, from a URL monitor of the web browser, a dynamic URL different from the static URLs, and comparing a top level domain of the dynamic URL to the one or more top level domains of the cloud application.

7. The proxy server of claim 6, wherein the operations further comprise, in response to determining the top level domain of the received URL does not match the one or more top level domains of the cloud application, redirecting the web browser away from the proxy server.

8. The proxy server of claim 6, wherein the operations further comprise, in response to determining the top level domain of the received URL does match the one or more top level domains of the cloud application, causing the web browser to navigate to a stalling webpage, requesting the certificate issuer generate a certificate for the received URL, and providing resources of the URL and the requested certificate to the web browser.

9. A method comprising:
   while providing access to a cloud application, receiving data indicating a first universal resource locator (URL) in a search bar of a web browser associated with the cloud application has changed to a second URL;
   determining whether the second URL has a valid certificate;

in response to determining the second URL is not associated with the application, re-directing the web browser away from the proxy server;

receiving, from an administrator of the cloud application, data indicating a top level domain of the cloud application, code of the cloud application, and a policy defining access control to the cloud application; and controlling access to the cloud application based on the policy.

10. The method of claim 9, wherein further comprising, in response to determining the certificate is not present in a certificates database, redirecting the web browser to a stalling webpage.

11. The method of claim 9, further comprising:
identifying one or more static URLs in the code of the cloud application; and
altering the identified URLs and the one or more top level domains to a different domain.

12. A non-transitory machine-readable medium including instructions that, when executed by a machine, cause the machine to perform operations comprising:
while providing access to the cloud application, receiving data indicating a first universal resource locator (URL) in a search bar of a web browser associated with the cloud application has changed to a second URL;
determining whether the second URL has a valid certificate;
in response to determining the second URL is not associated with the application, re-directing the web browser away from a proxy server hosting the cloud application;
receiving, from an administrator of the cloud application, data indicating a top level domain of the cloud application, code of the cloud application, and a policy defining access control to the cloud application; and
controlling access to the cloud application based on the policy.

13. The non-transitory machine-readable medium of claim 12, wherein the operations further comprise:
identifying one or more static URLs in the code of the cloud application; and
altering the identified URLs and the one or more top level domains to a different domain by inserting a different endpoint directly after the top level domain of the URLs, wherein the endpoint is controlled by cloud provider.

14. The non-transitory machine-readable medium of claim 13, wherein the operations further comprise generating, for each of the identified static URLs, a corresponding certificate and storing the static URLs and corresponding certificate in a certificates database.

15. The non-transitory machine-readable medium of claim 13, wherein the operations further comprise receiving, from a URL monitor of the web browser, a dynamic URL different from the static URLs, and comparing a top level domain of the dynamic URL to the one or more top level domains of the cloud application.

16. The non-transitory machine-readable medium of claim 15, wherein the operations further comprise, in response to determining the top level domain of the received URL does not match the one or more top level domains of the cloud application, redirecting the web browser away from the proxy server or, in response to determining the top level domain of the received URL does match the one or more top level domains of the cloud application, causing the web browser to navigate to a stalling webpage, requesting the certificate issuer generate a certificate for the received URL, and providing resources of the URL and the requested certificate to the web browser.

* * * * *